No. 812,174. PATENTED FEB. 6, 1906.
G. GRÖNDAL.
METHOD OF MANUFACTURING IRON SPONGE.
APPLICATION FILED APR. 4, 1905.
2 SHEETS—SHEET 1.
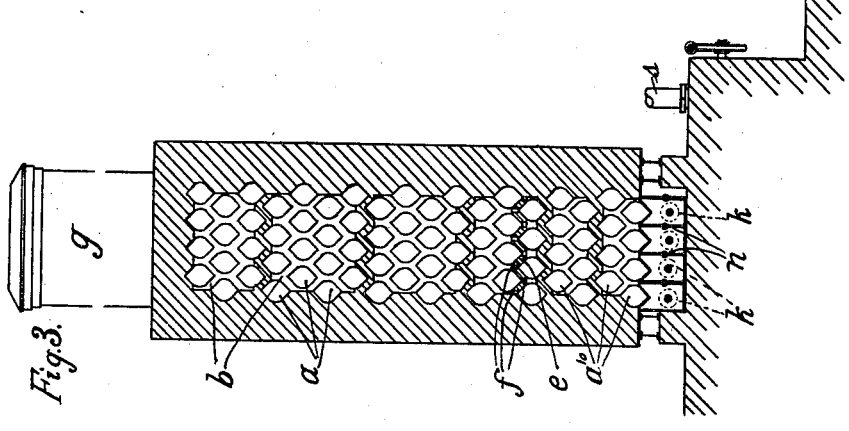
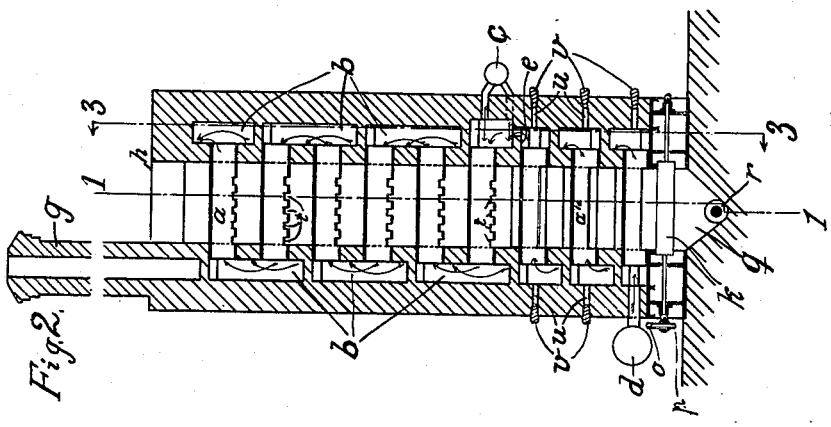
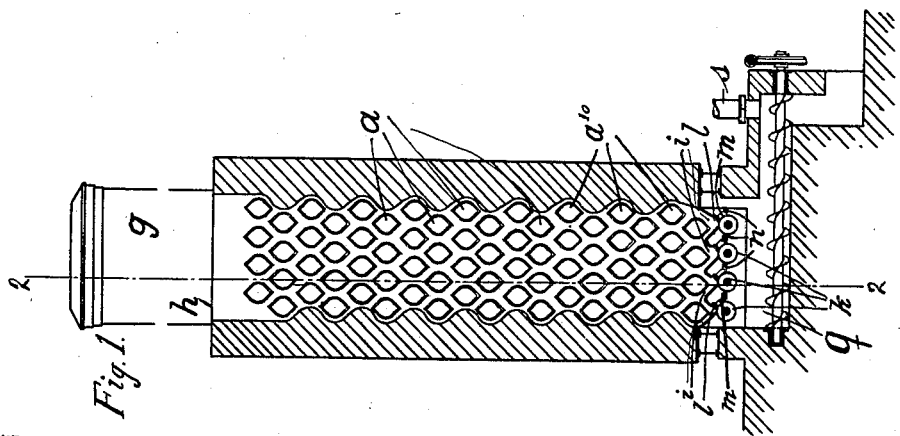
WITNESSES
Paul A Blair
Wallin Abbr
INVENTOR
Gustaf Gröndal
BY
Howson and Howson
ATTORNEYS No. 812,174. PATENTED FEB. 6, 1906.
G. GRÖNDAL.
METHOD OF MANUFACTURING IRON SPONGE.
APPLICATION FILED APR. 4, 1905.
2 SHEETS—SHEET 2.
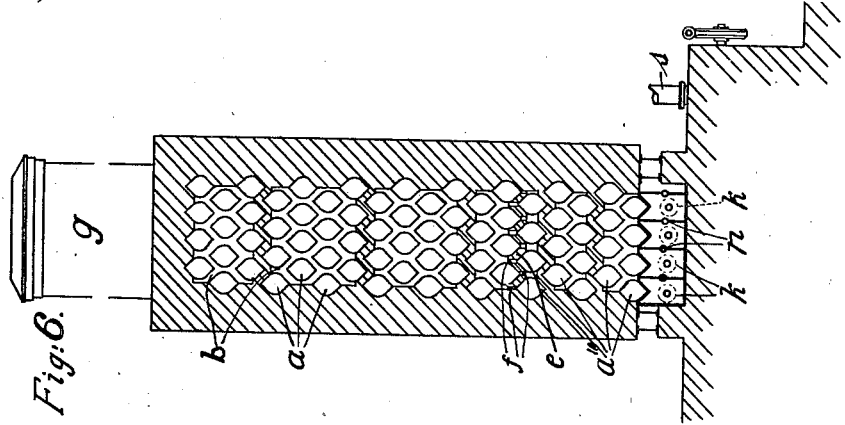
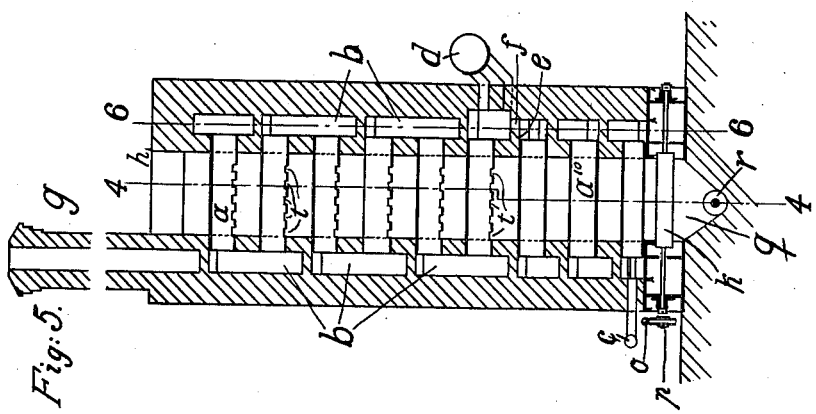
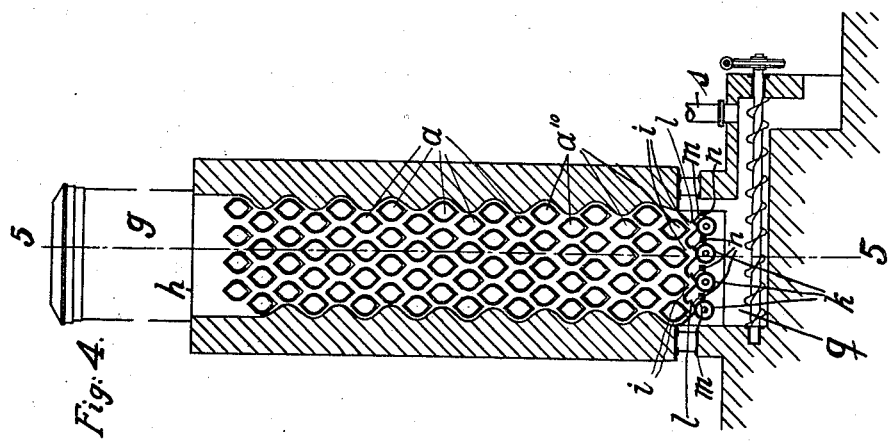
WITNESSES
Paul A. Blair.
Walter Abbe
INVENTOR
Gustaf Gröndal
BY
Howson and Howson
ATTORNEYS

UNITED STATES PATENT OFFICE.

GUSTAF GRÖNDAL, OF DJURSHOLM, SWEDEN.

METHOD OF MANUFACTURING IRON SPONGE.

No. 812,174. Specification of Letters Patent. Patented Feb. 6, 1906.

Original application filed March 31, 1903, Serial No. 150,441. Divided and this application filed April 4, 1905. Serial No. 253,876.

*To all whom it may concern:*

Be it known that I, GUSTAF GRÖNDAL, a subject of the King of Sweden and Norway, and a resident of Djursholm, Sweden, have invented certain new and useful Improvements in Manufacturing Iron Sponge from a Mixture of Iron Ore and Carbon, of which the following is a specification.

On heating a mixture of iron ore and charcoal, coal, cokes, &c., hereinafter called "carbon," without access of air, the iron is reduced, as well known, into the form of so-called "iron sponge."

The object of the present invention is to carry out this method with pulverous or pulverized materials, which is advantageous for the reduction and to render the process economical, uniform, and continuous. I employ for this purpose an upright furnace of any suitable cross-section so arranged as to allow, on the one hand, the charged mixture of ore and carbon of its own weight to move through the furnace from the mouth to the discharge opening or openings, and, on the other hand, the combustible mixture used for producing the suitable temperature for the reduction to act in the necessary manner on the ore and carbon mixture in the reducing zone of the furnace.

In order to carry out the invention in the desired manner, I use as a cooling agent for the cooling of the iron sponge either the combustible gas or the atmospheric air, which is forced or led through passages to and fro until the iron sponge has been cooled in the necessary degree before being delivered through the discharge-openings, and I make the furnace so high that the combustion products of the gaseous combustible which are also led through passages to and fro have time enough to give off the main part of their heat to the charged mixture of ore and carbon and to preliminarily heat said mixture, and the gases generated during the reduction of the ore are drawn off from the spot where they are generated in the furnace. When combustible gas is used as the cooling agent, it is advantageous to make the passages open at the under side toward the interior of the furnace in order to allow the iron sponge to come into contact with the combustible gas, which it imbibes eagerly, and thereby the iron sponge in issuing from the furnace becomes insensible to the otherwise injurious action of the air. During the cooling action of the combustible gas on the hot iron sponge the gas is heated and in the lowest part of the reducing zone of the furnace atmospheric air is admitted into the passages and the mixture of combustible gas and air is or becomes ignited and heats up the mixture of ore and carbon. The passages wherein the gaseous mixture is burned, as well as the passages for the combustion products, are perforated on the under side toward the interior of the furnace in order that the gases generated by the reduction of the ore may escape immediately through these perforations into the passages and pass off at the upper end of the furnace, together with the combustion products. When the air is used for cooling the iron sponge, the passages belonging to the cooling zone must be without openings at the under side, and the combustible gas is made to enter the passages at the lowest part of the reducing zone, and the gas and air mixture becomes ignited in the same manner as above described. The passages above the cooling zone even now must have perforations at the under side in order to draw off the gases generated by the reduction.

On the accompanying drawings there is shown, by way of examples, two forms of furnace suitable for the purpose having a rectangular cross-section and being provided with passages both in the walls and in the interior.

Figures 1 to 3 show a furnace in which the combustible gas is used as a cooling agent, and Figs. 4 to 6 show a furnace in which the air is used as a cooling agent. Figs. 1 and 3 are vertical sections of the furnace along the lines 1 1 and 3 3 of Fig. 2, and Fig. 2 is a vertical section along the line 2 2 of Fig. 1. Figs. 4, 5, and 6 are like sections along the lines 4 4, 5 5, and 6 6 in Figs. 4 and 5.

As shown, all forms of furnaces are provided with tubes $a$ $a'$ $a^{10}$, arranged in zigzag across the shaft and of such an exterior form that will not prevent the uniform sinking of the mass of ore and carbon through the furnace.

$b$ represents chambers in the furnace-walls connecting the tubes of one range with the tubes of the range or ranges lying next above. $c$ represents an inlet-pipe for the atmospheric air; $d$, an inlet-pipe for combustible gas.

The chamber $b$, in which the air, Fig. 3, or the gas, Fig. 6, enters, is separated from the chamber located below by means of a bottom $e$, provided with holes $f$, through which the heated gas or air from the tubes $a'$ enters.

$t$ represents the holes in the bottom of the tubes $a$.

$g$ is the chimney for the escaping combustion products, and $h$ is the mouth of the furnace.

The whole area of the bottom of the furnace consists of longitudinal depressions $i$ with sloping sides, lying alongside each other and open downward. Under each opening there is a roll $k$, covering part of the opening. The remaining part of the opening is covered by a shutter $l$, resting in the shut position, with one edge against the roll $k$. Each shutter $l$ is carried by arms $m$, projecting from a shaft $n$, which is capable of being turned from the outside. By turning all these shafts the shutters $l$ can be adjusted, and thereby the width of the discharge-openings, and thus the delivery of the iron sponge from the furnace can be regulated. The rolls $k$ are kept rotating continually and are operated by any mechanical means—as, for instance, worm-gear $o$ and $p$. The iron sponge issuing from the openings mixed with carbon, and it may be with non-reduced ore, falls down into a room $q$, in which there is provided a screw conveyer $r$, which carries the iron sponge farther out of the furnace. When the iron sponge has just been discharged from the furnace proper, it is necessary that it should be protected against the action of the air, and for this purpose the room $q$ is closed and connected by a pipe $s$ with a supply of an indifferent or reducing gas which is absorbed by the iron sponge in case the air is the cooling agent, the iron sponge being thereby rendered indifferent to the oxidizing action of the air.

In Figs. 1 to 3 the tubes $a'$, through which the combustible gas passes from the inlet-pipe $d$, have no bottoms, as shown, and opposite the ends of these tubes the walls of the furnace are provided with holes $u$, through which the run of the operation in the cooling zone of the furnace may be observed and through which a rod or the like may be introduced into the furnace for stirring the material, if required. $v$ are plugs for the holes $u$; but the holes may be closed in any other suitable way.

In Figs. 4 to 6 the tubes $a^{10}$, through which the air passes from the pipe $c$, which is unperforated so that the air can penetrate into the surrounding mass and oxidize the iron sponge.

If desired, both the combustible gas and air may be used together as cooling agents for the iron sponge; but then they ought, of course, to be led through separate passages.

In the drawings all the tubes are shown to be of the same thickness and all are assumed to be of iron; but, if desired, some of them, especially at the beginning of the reducing zone, where the heat is the highest, may be made of refractory material.

I claim—

1. The herein-described process of producing iron sponge, consisting in continually feeding the iron ore and carbon mixture through a furnace, and feeding a mixture of combustible gas and air divided into a number of streams repeatedly through the mixture in said furnace to reduce said mixture to iron sponge.

2. The herein-described process of producing iron sponge, consisting in continually feeding the iron ore and carbon mixture through a furnace, and feeding a mixture of combustible gas and air divided into a number of streams repeatedly through the mixture in said furnace to reduce said mixture to iron sponge, and feeding one of the components of said gas mixture divided into a number of streams repeatedly through the iron sponge produced.

3. The herein-described process of producing iron sponge, consisting in continually feeding the iron ore and carbon mixture through a furnace, feeding a mixture of combustible gas and air divided into a number of streams repeatedly through the mixture in said furnace to reduce said mixture to iron sponge, feeding one of the components of said gas mixture divided into a number of streams repeatedly through the iron sponge produced, and carrying away the gases evolved from the mixture of iron ore and carbon during the reducing operation from the spot where they are generated.

4. The herein-described process of producing iron sponge, consisting in continually feeding the iron ore and carbon mixture through a furnace, and feeding a mixture of combustible gas and air divided into a number of streams repeatedly through the mixture in said furnace to reduce said mixture to iron sponge, and admitting a cooling agent for cooling the iron sponge.

5. The herein-described process of producing iron sponge, consisting in continually feeding the iron ore and carbon mixture through a furnace, and feeding a mixture of combustible gas and air divided into a number of streams repeatedly through the mixture in said furnace to reduce said mixture to iron sponge, and admitting a cooling agent for cooling the iron sponge, without coming into physical contact therewith.

In testimony whereof I have signed my name to this specification in the presence of two subscribing witnesses.

GUSTAF GRÖNDAL.

Witnesses:
 FREDRIK L. ENQUIST,
 A. HELJESTRAND.